United States Patent [19]

Winebrenner

[11] Patent Number: 5,740,760
[45] Date of Patent: Apr. 21, 1998

[54] FREEZE RESISTANT LIVESTOCK WATERER

[76] Inventor: Richard L. Winebrenner, 2651 265th St., Peru, Iowa 50222

[21] Appl. No.: 648,205

[22] Filed: May 14, 1996

[51] Int. Cl.$^6$ ........................................ A01K 7/04
[52] U.S. Cl. ................................................ 119/73
[58] Field of Search ............................. 119/73, 74

[56] References Cited

U.S. PATENT DOCUMENTS

| | | |
|---|---|---|
| 950,066 | 2/1910 | Blackburn . |
| 1,013,008 | 12/1911 | Funk . |
| 1,060,972 | 5/1913 | Crockford . |
| 1,325,474 | 12/1919 | Kearnes ................................ 119/73 |
| 2,087,173 | 7/1937 | Uden ................................ 119/73 X |
| 2,509,455 | 5/1950 | Rysdon ................................ 119/73 |
| 3,306,263 | 2/1967 | Johnson ................................ 119/73 |
| 5,003,928 | 4/1991 | Ketterlin et al. ................... 119/73 |
| 5,146,873 | 9/1992 | Gray ................................ 119/73 |

Primary Examiner—Robert P. Swiatek
Attorney, Agent, or Firm—Zarley, McKee, Thomte, Voorhees, & Sease

[57] ABSTRACT

A livestock waterer has a first compartment which is typically buried below ground level and has a pressurized water line entering therein. A second compartment is mounted above the first compartment and over an opening in the top of the first compartment so that air in the first compartment is in communication with the air surrounding the second compartment. A third compartment with its bottom portion also buried in the earth surrounds the second compartment and has an open top communicating with an open top of the second compartment. The water line in the first compartment is in communication with the interior of the second compartment. A float valve on the fluid line controls the level of fluid entering into the second compartment. A flexible skirt device surrounds the space between the opening in the second compartment and the opening in the third compartment. The three compartments are free from heat elements.

5 Claims, 2 Drawing Sheets

FREEZE RESISTANT LIVESTOCK WATERER

BACKGROUND OF THE INVENTION

Livestock waterers for hogs and cattle must frequently be located out of doors where they are subjected to sub-freezing temperatures in the late fall, winter and early spring seasons. Many waterers exist which provide electrical heating elements to prevent freezing of the water. This equipment is expensive to purchase and install, and requires periodic maintenance. When a power failure occurs in freezing weather, these existing devices are subject to severe damages as water lines freeze and rupture.

It is therefore a principal object of this invention to provide a livestock waterer for outdoor use which will be completely operational throughout freezing temperatures without providing electric or fuel generated heat.

A further object of this invention is to provide a livestock waterer for use in freezing temperatures which will remain operational through the use of latent heat in the ground.

A still further object of this invention is to provide a livestock waterer for use in freezing temperatures which is inexpensive to install, use and maintain.

These and other objects will be apparent to those skilled in the art.

SUMMARY OF THE INVENTION

A livestock waterer has a first compartment which is typically buried below ground level and has a pressurized water line entering therein. A second compartment is mounted above the first compartment and over an opening in the top of the first compartment so that air in the first compartment is in communication with the air surrounding the second compartment. A third compartment with its bottom portion also buried in the earth surrounds the second compartment and has an open top communicating with an open top of the second compartment. The water line in the first compartment is in communication with the interior of the second compartment. A float valve on the fluid line controls the level of fluid entering into the second compartment. A flexible skirt device surrounds the space between the opening in the second compartment and the opening in the third compartment. The three compartments are free from heat elements.

DESCRIPTION OF THE PREFERRED EMBODIMENT

Figure 1:
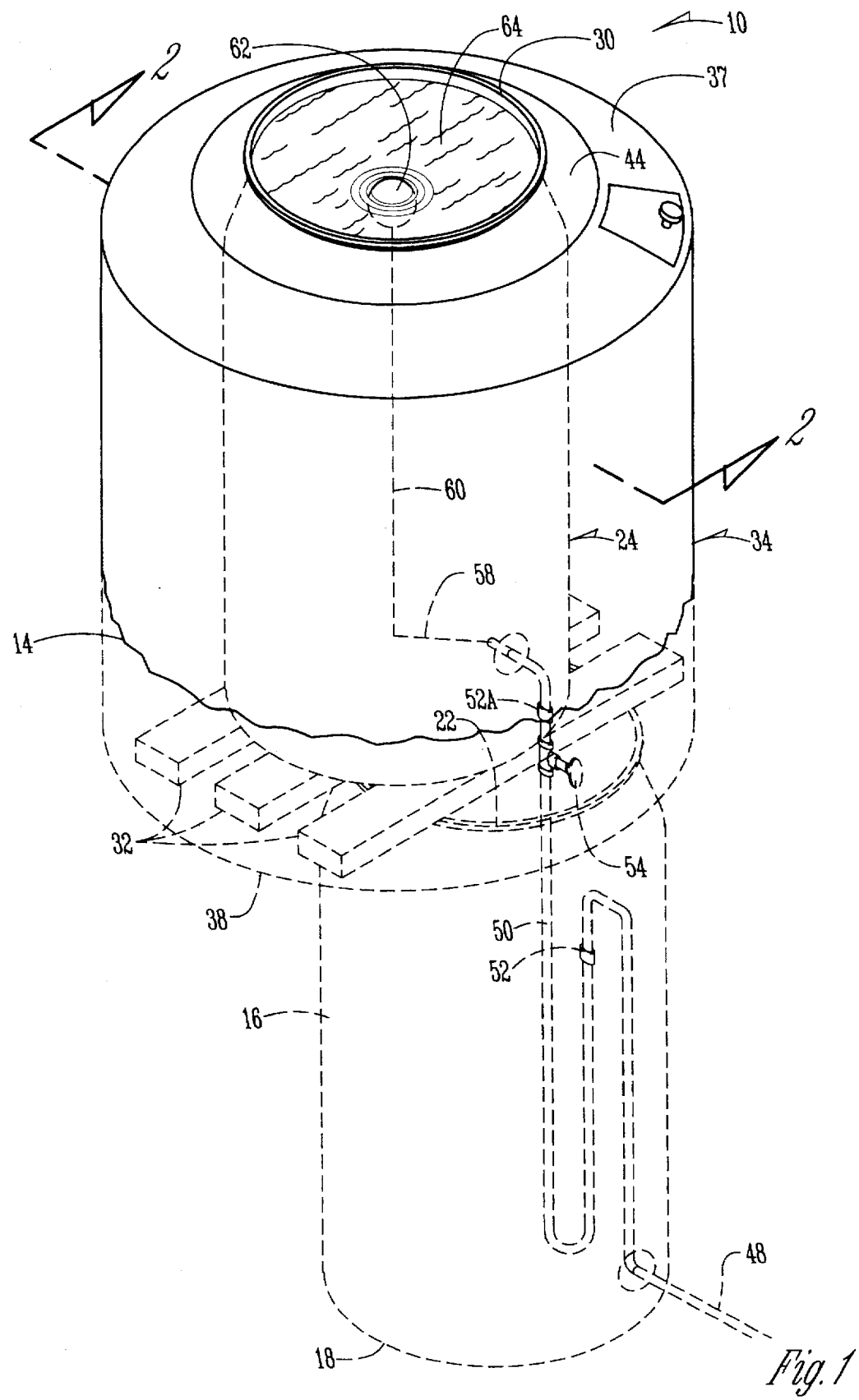
FIG. 1 is a perspective view of the device of this invention.

The waterer 10 of this invention has portions thereof buried in the soil 12 below the ground level 14.

The waterer 10 includes a first compartment 16 which is of plastic construction and is preferably cylindrical in shape. Compartment 16 has a bottom 18, side walls 20 and an open top 22.

A second compartment 24 has a bottom 26, side walls 28 and an open top 30. Spaced bars or wooden slats 32 separate the bottom of the second compartment 24 from the open top 22 of compartment 16 so that the air in compartment 16 can be in communication with the air around the second compartment 24.

A third compartment 34 surrounds the second compartment 24 and is comprised of an open top 36 which is slightly larger than the open top 30 of compartment 24. Top 36 is surrounded by sloping shoulder 37. A removable access opening and closure 37A is located in shoulder 37. The top 30 of compartment 24 extends slightly through and above the open top 36 of compartment 34. Compartment 34 has a bottom 38 with an opening 40 therein which registers with the open top 22 in compartment 16. Compartment 34 also has vertical side walls 42. Both of the compartments 24 and 34, like compartment 16, are comprised of plastic material. A flexible skirt of rubber or the like 44 is secured to and extends between the open top 36 of compartment 34 and the open top 30 of compartment 24. Suitable insulation material 46 is adhered to by any conventional means to the interior side walls 42 of compartment 34.

Figure 2:
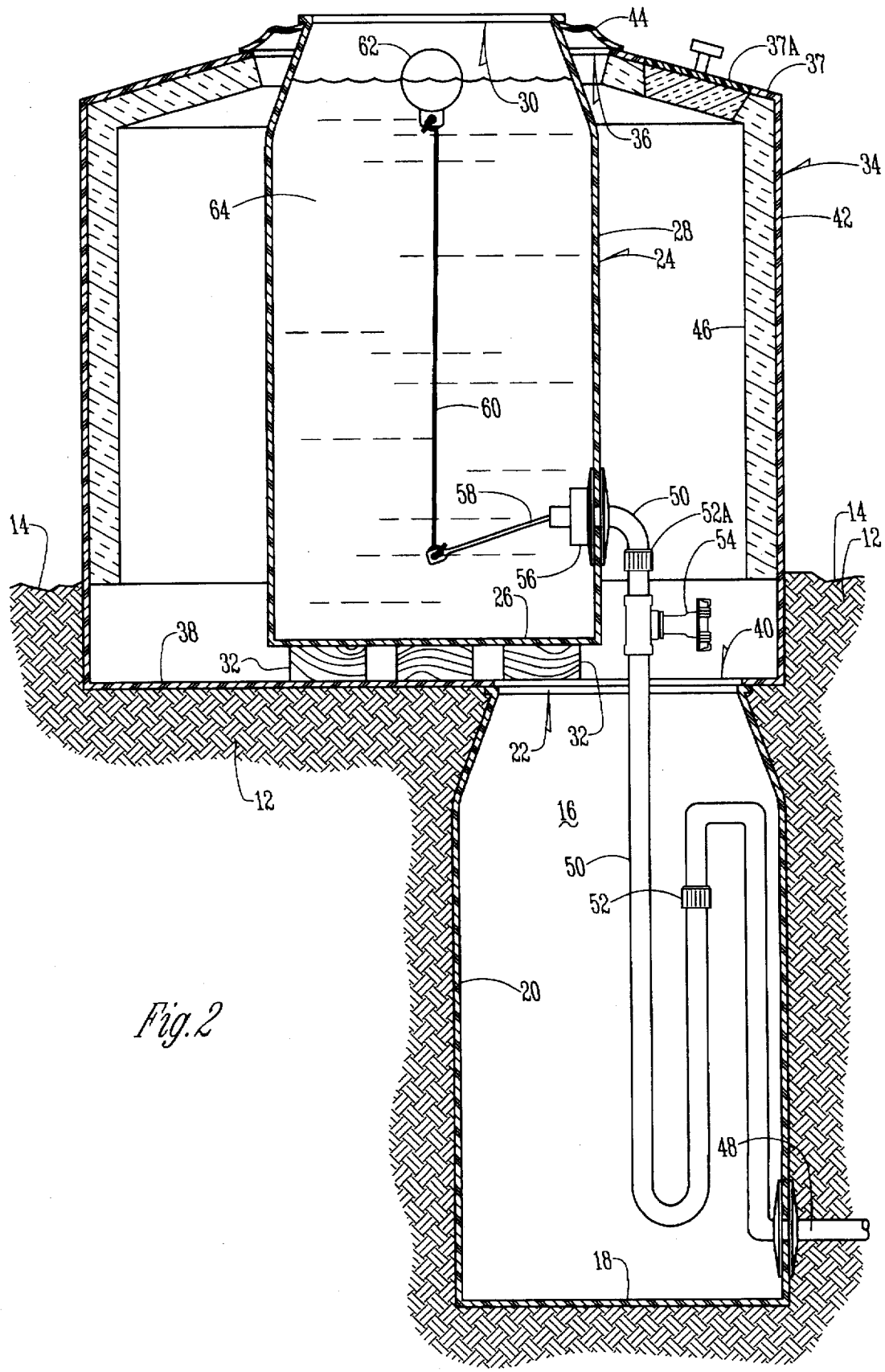
FIG. 2 is a vertical sectional view of the device of FIG. 1 taken on lines 2—2 of FIG. 1.

A pressurized water line 48 extends into compartment 16 at the lower portion thereof and is coupled to a flexible water line 50 by coupler 52. A suitable fluid valve 54 is imposed in line 50 to open and close line 50 for fluid flow. Valve 54 is normally in an open condition. A second coupler 52A can be imposed in line 50 just above valve 54. A conventional float valve 56 is imposed in the upper end of line 50. A pivotal link 58 extends from float valve 56 and is pivotally connected to a vertically disposed flexible line 60 which is tied to a conventional hollow float 62 on the upper end thereof. Typically, the level of float 62 is predetermined by tying line 60 to float 62 at the desired level. The float 62 will open the valve 56 through flexible line 60 and link 58 when the upper level of water 64 drops below the level shown in FIGS. 1 and 2. The dropping of the level of float 62 will thereupon open valve 56 to fluid flow, and this fluid flow will then stop when the float 62 rises to the approximate level shown in FIG. 2.

The latent heat in the soil 12 normally stays at approximately 55 degrees even during the winter months at a level of three feet or so below the ground level 14. This latent heat is transmitted through the walls of compartment 16 wherein the air within compartment 16 assumes the same temperature as the soil surrounding it. This latent heat in compartment 16 thereupon rises and mixes with the air around compartment 24 by rising through the open top 22 in compartment 16. Thus, the temperature of the air in compartment 16 and around the compartment 24, and within compartment 34 normally is at 55 degrees or slightly below during the most severe winter conditions.

The upper level of water 64 in compartment 24 is obviously exposed to the outside atmosphere through the opening 30 in compartment 34. In sub-freezing weather, the upper surface of this water may freeze to form a light layer of ice. However, it has been found that the livestock themselves can break this ice and drink from compartment 24. To the extent that the livestock are unable or do not break this layer of ice, it can be easily broken by the attending livestock manager so as to enable the livestock to freely drink from the device. This layer of ice does not form in any event until the temperature is well below 32 degrees Fahrenheit.

All of the compartments 16, 24 and 34 are free from heating elements, so no supplemental heating energy is required for this device to successfully operate.

Of great importance is that the valve 56 is separated from the upper level of water 64, and is protected from freezing as is the entire line 50 and valve 54.

If shoulder 37 were made as a part of compartment 24, the skirt 44 could be eliminated. Also, compartments 34 and 16 could be joined together to comprise a single compartment.

It is therefore seen that this invention will achieve at least all of its stated objectives.

What is claimed is:

1. An operationally freezeless livestock waterer, comprising, a first compartment having a bottom portion, and open top portion, and sidewalls for location in the ground, a pressurized water line in the ground and entering said first compartment at its lower portion and extending upwardly through said upper portion and terminating in an upper end, a second compartment having a bottom, sidewalls, and an open top, means for supporting said second compartment above said first compartment with the bottom thereof in spaced relation to the top portion of said first compartment, a third compartment having an open top, sidewalls and bottom extending over said first compartment so that the bottom of said third compartment extends over the open top portion of said first compartment, and so that the sidewalls thereof are spaced from the sidewalls of said second compartment, said third compartment having an opening in the top thereof and surrounding the open top of said second compartment, said opening in the top of said third compartment being substantially at the same vertical height as that of the open top of said second compartment, the sidewalls of said third compartment being insulated, with the bottom of said sidewalls locatable below an upper level of the ground, and a float activated valve connecting the upper end of said pressurized water line and the interior of said second compartment to substantially fill said second compartment with water while the latent heat from the ground will be transmitted to the air in said first compartment, and thence to the air around said second compartment, and thence through the sidewalls of said second compartment into the water within said second compartment to prevent said valve from freezing.

2. The device of claim 1 wherein said first, second and third compartments are free from heat elements.

3. The device of claim 1 wherein the horizontal cross sectional area of said first and second compartments are substantially the same.

4. The device of claim 1 wherein said first, second and third compartments are comprised of a plastic material.

5. The device of claim 1 wherein the open top of said third compartment is of a greater size than the open top of said second compartment to create a space therebetween, and a skirt element spanning said space to enclose the interior of said third compartment.

* * * * *